United States Patent
Shivanna et al.

(10) Patent No.: US 9,594,619 B2
(45) Date of Patent: Mar. 14, 2017

(54) ROBUST HARDWARE FAULT MANAGEMENT SYSTEM, METHOD AND FRAMEWORK FOR ENTERPRISE DEVICES

(71) Applicant: Hewlett-Packard Development Company, L.P., Houston, TX (US)

(72) Inventors: Suhas Shivanna, Bangalore (IN); Valentin Anders, San Jose, CA (US); Sunil Malhotra, Bangalore (IN); Omkar S Prabhakar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 19 days.

(21) Appl. No.: 14/434,241

(22) PCT Filed: Oct. 8, 2012

(86) PCT No.: PCT/US2012/059161
§ 371 (c)(1),
(2) Date: Apr. 8, 2015

(87) PCT Pub. No.: WO2014/058409
PCT Pub. Date: Apr. 17, 2014

(65) Prior Publication Data
US 2015/0293800 A1  Oct. 15, 2015

(51) Int. Cl.
G06F 11/00 (2006.01)
G06F 11/07 (2006.01)
H04L 12/24 (2006.01)

(52) U.S. Cl.
CPC ........ *G06F 11/079* (2013.01); *G06F 11/0709* (2013.01); *G06F 11/0748* (2013.01);
(Continued)

(58) Field of Classification Search
CPC ............... G06F 11/079; G06F 11/2257; G06F 11/0709; G06F 11/0793
(Continued)

(56) References Cited

U.S. PATENT DOCUMENTS 6,006,016 A  12/1999  Faigon et al.
6,883,120 B1  4/2005  Banga
(Continued)

FOREIGN PATENT DOCUMENTS

CN  85106154  3/1987
CN  101640756  2/2010
(Continued)

OTHER PUBLICATIONS

A Technical Overview of the Oracle SPARC SuperCluster T4-4; Feb. 2012, 22 pps. http://www.oracle.com/us/products/servers-storage/servers/sparc-enterprise/supercluster-t4-4-arch-wp-1537679.pdf.
(Continued)

*Primary Examiner* — Amine Riad
(74) *Attorney, Agent, or Firm* — Hewlett Packard Enterprise Patent Department

(57) ABSTRACT

A robust hardware fault management system, method and framework for providing robust hardware fault management for enterprise devices are disclosed. In one example, hardware devices and associated hardware modules in each of the enterprise devices requiring the robust hardware fault management are identified. Further, error structures associated with each hardware module are determined and unique identifiers are assigned to the determined error structures. Furthermore, the error structures are modeled in a centralized repository. In addition, rules are associated with each modeled error structure for detecting hardware failures. Moreover, the rules of each modeled error structure are
(Continued)

stored in the centralized repository using associated rule identifiers.

19 Claims, 3 Drawing Sheets

(52) U.S. Cl.
CPC ...... G06F 11/0751 (2013.01); G06F 11/0754 (2013.01); H04L 41/069 (2013.01)
(58) Field of Classification Search
USPC .......................................................... 714/26
See application file for complete search history.

(56) References Cited

U.S. PATENT DOCUMENTS

| | | | |
|---|---|---|---|
| 7,231,550 B1 * | 6/2007 | McGuire ............ | G06F 11/0709 714/26 |
| 7,757,124 B1 * | 7/2010 | Singh ................. | G06F 11/26 714/32 |
| 7,885,915 B2 * | 2/2011 | Parson ................ | G06F 17/271 706/47 |
| 8,498,635 B2 * | 7/2013 | Stenberg ............ | H04Q 3/0075 370/242 |
| 8,949,671 B2 * | 2/2015 | Mukherjee ......... | G06F 11/0718 714/26 |
| 9,069,737 B1 * | 6/2015 | Kimotho ............ | G06F 11/1484 |
| 9,317,355 B2 * | 4/2016 | Ahrens .............. | G06F 11/0769 |
| 2008/0114744 A1 * | 5/2008 | Colby ................ | G06F 17/30448 |
| 2008/0276135 A1 | 11/2008 | Granath | |
| 2009/0182861 A1 | 7/2009 | Hirsch | |
| 2010/0026511 A1 | 2/2010 | Akao et al. | |
| 2010/0138728 A1 * | 6/2010 | Kim .................... | G06F 9/542 714/799 |
| 2010/0146342 A1 | 6/2010 | Davenport et al. | |
| 2011/0099428 A1 | 4/2011 | Stenberg et al. | |
| 2011/0141913 A1 | 6/2011 | Clemens et al. | |
| 2011/0145926 A1 * | 6/2011 | Dalcher .............. | G06F 11/3466 726/26 |
| 2011/0231707 A1 | 9/2011 | Davenport | |
| 2011/0231742 A1 | 9/2011 | Olson | |
| 2012/0239981 A1 * | 9/2012 | Franke ................ | G06F 11/368 714/38.1 |
| 2013/0268260 A1 * | 10/2013 | Lundberg ........... | G06F 17/28 704/8 |
| 2015/0142501 A1 * | 5/2015 | Nair ................... | G06Q 10/06316 705/7.26 |

FOREIGN PATENT DOCUMENTS

| | | |
|---|---|---|
| EP | 0170515 | 2/1986 |
| KR | 20050055129 | 6/2005 |
| TW | I287724 | 10/2007 |

OTHER PUBLICATIONS

CA Spectrum® Network Fault Manager; Sep. 24, 2003, 18 pps. http://www.devoteam.ch/de/2/products/downloads/spectrum_family_brief.pdf.
PCT/ISA/KR, International Search Report, mailed Apr. 29, 2013, PCT/US2012/059161, 9 pps.
CN First Office Action dated Nov. 11, 2016, CN Patent Application No. 201280076291.1 dated Oct. 8, 2012, State Intellectual Property Office of the P.R. China, 8 pages.

* cited by examiner

ROBUST HARDWARE FAULT MANAGEMENT SYSTEM, METHOD AND FRAMEWORK FOR ENTERPRISE DEVICES

BACKGROUND

In today's network enterprise systems, business reliability, availability, and serviceability (RAS) features are the hallmark of any mission critical server. Typically, RAS features are achieved with robust fault management solutions. Such fault management solutions are critical to improve the availability and serviceability of enterprise devices in the network enterprise systems.

However, most of the existing fault management solutions cannot dynamically update the enterprise devices for detecting new failure symptoms without software and firmware updates. Such updates frequently call for a service or system downtime. Currently, the analysis rules are captured in different word documents, excel sheets or using a programmatic language. Further, there is no standard way of managing the analysis rules as each enterprise device defines its own analysis rules and event notification data for a hardware component. Moreover, the non-standard methodology of capturing the analysis rules may lead to misinterpretation, resulting in incomplete and incorrect analysis. As the volume of enterprise devices increases, any wrong analysis of failure symptoms or unnecessary event notifications can have a huge impact to availability, customer experience and support cost. With constant innovations in the hardware components and advancements in a fabrication technology, the analysis rules based on past experience may not be appropriate for new enterprise devices and require constant refinement based on new detected failure patterns.

Furthermore, existing fault management code base is different for each class of enterprise device, making it practically difficult to manage and leverage the hardware analysis rules and events embedded in the code. With the existing hardware design, any updates made to the enterprise device may result in requiring new version of the code and multiple software and firmware upgrades at the customer place. This may dramatically increase support cost and reduced total customer experience (TCE).

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A robust hardware fault management system, method and framework for enterprise devices are disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

The terms "rules", "analysis rules" and "hardware analysis rules" are used interchangeably throughout the document.

Figure 1:
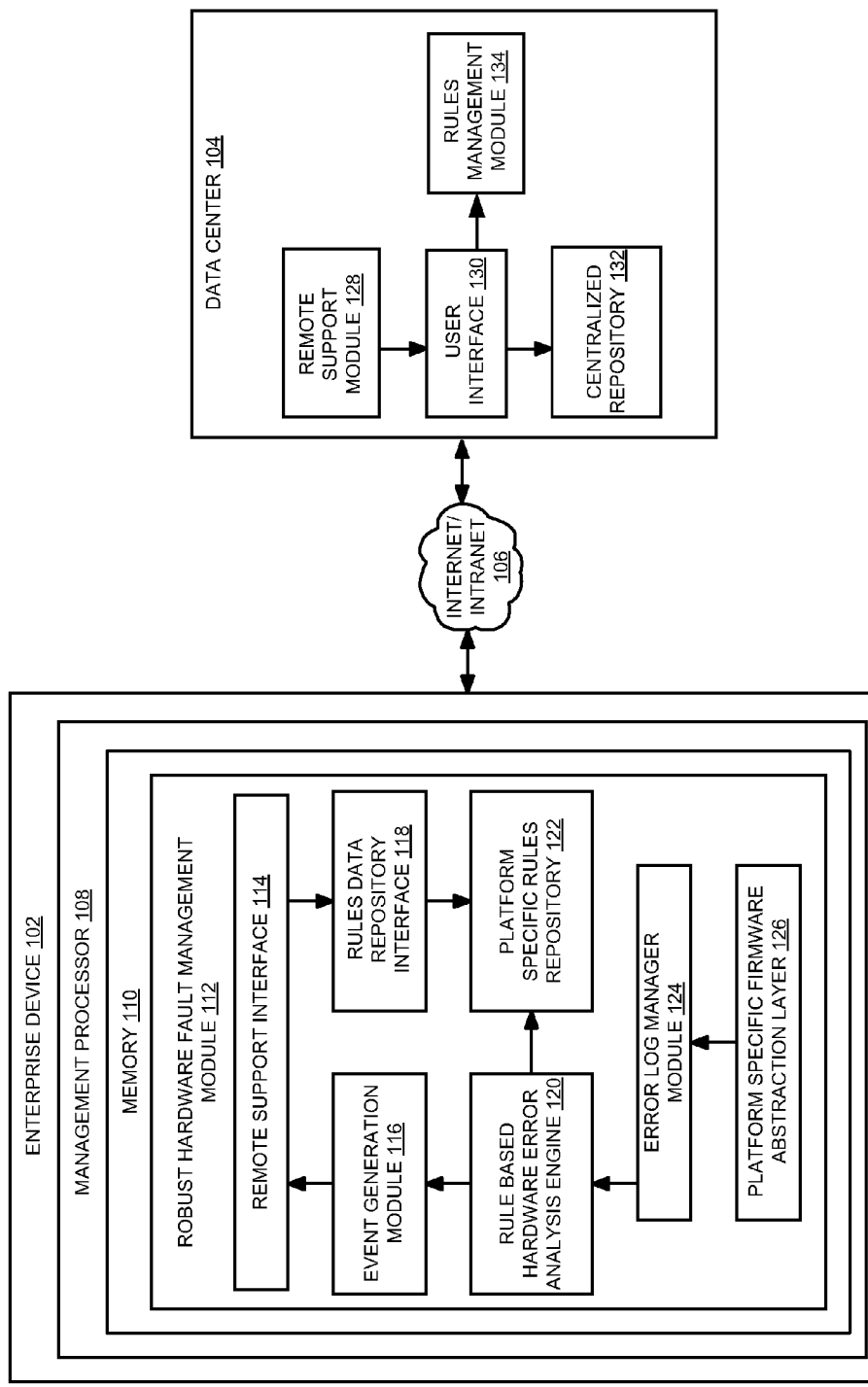
FIG. 1 illustrates an exemplary block diagram of a robust hardware fault management system for an enterprise device.

FIG. 1 illustrates an exemplary block diagram 100 of a robust hardware fault management system for an enterprise device 102. Exemplary enterprise devices include a server, a storage device, a networking device and the like. As shown in FIG. 1, the robust hardware fault management system includes the enterprise device 102, a data center 104 and an Internet/Intranet 106. Further, the enterprise device 102 includes a management processor 108. Furthermore, the management processor 108 includes memory 110. In addition, the memory 110 includes a robust hardware fault management module 112. Moreover, the robust hardware fault management module 112 includes a remote support interface 114, an event generation module 116, a rules data repository interface 118, a rule based hardware error analysis engine 120, a platform specific rules repository 122, an error log manager module 124, and a platform specific firmware abstraction layer 126. Also, the data center 104 includes a remote support module 128, a user interface 130, a centralized repository 132 and a rules management module 134.

Further, the enterprise device 102 is connected to the data center 104 via the Internet/Intranet 106. Furthermore, the platform specific firmware abstraction layer 126 is coupled to the error log manager module 124. In addition, the error log manager module 124 is coupled to the rule based hardware error analysis engine 120. Moreover, the rule based hardware error analysis engine 120 is coupled to the platform specific rules repository 122 and the event generation module 116. Also, the event generation module 116 is coupled to the remote support interface 114. Further, the remote support interface 114 is coupled to the rules data repository interface 118. Furthermore, the rules data repository interface 118 is coupled to the platform specific rules repository 122. In addition, the remote support module 128 is coupled to the user interface 130. Moreover, the user interface 130 is coupled to the rules management module 134 and the centralized repository 132. Also, the rules management module 134 is coupled to the centralized repository 132.

In operation, the rules management module 134 identifies hardware devices and associated hardware modules in the enterprise device 102. Further, the rules management module 134 determines error structures, with unique type values containing hardware control and status registers and other related information, associated with each hardware module and assigns unique identifiers to the determined error structures. Furthermore, the rules management module 134 models the error structures in the centralized repository 132. In addition, the rules management module 134 associates rules with each modeled error structure for detecting hardware failures. Moreover, the rules management module 134 stores the rules of each modeled error structure in the centralized repository 132 using associated rule identifiers. In one example, the centralized repository 132 stores hardware analysis rules and the associated events and supports dynamic update of the hardware analysis rules, based on a pattern of failures observed after the enterprise device 102 is released.

Also in operation, the robust hardware fault management module 112 dynamically updates/stores the rules of each modeled error structure in the platform specific rules repository 122 by obtaining the rules of the modeled error structures from the centralized repository 132 upon connecting to the centralized repository 132. In one example, the rules applicable for the enterprise device 102 are downloaded using the remote support interface 114. Alternatively, a customer or support engineer can run a command on the management processor 108 to download the rules with new control status register (CSR)/model specific registers (MSR) settings from a designated storage area. Further, the rules data repository interface 118 supports authenticated applications and users to dynamically update rules and events in the platform specific rules repository 122 without the need for a firmware update.

Further in operation, the robust hardware fault management module 112 receives an error structure associated with a hardware module in a binary or platform specific format upon an occurrence of a hardware error associated with the hardware module. Particularly, the platform specific firmware abstraction layer 126 receives the error structure in the binary or platform specific format when the hardware error occur and reads these logs and sends to the error log manager module 124. In addition, the robust hardware fault management module 112 decodes the error structure in the binary or platform specific format to a standard format. Particularly, the error log manager module 124 decodes the error structure in the binary or platform specific format to the standard format and assigns a unique type value to the decoded error structure. In one exemplary implementation, the error log manager module 124 decodes the error structure in the binary or platform specific format to a 'name/value' pair generic data structure with the 'name' field containing a CSR/MSR name associated with the hardware device and the 'value' field containing the current value of the CSR. The error log manager module 124 may choose to add additional information, such as a serial number, a part number, and the like about the hardware devices to the error structure when converting the error structure in the binary or platform specific format to the standard format. Further, the error log manager module 124 sends the decoded error structure to the rule based hardware error analysis engine 120.

Moreover, the robust hardware fault management module 112 compares the decoded error structure type value with the rules of the modeled error structures stored in the platform specific rules repository 122. In one exemplary implementation, the rule based hardware error analysis engine 120 retrieves the rules applicable for the received error structure from the platform specific rules repository 122 and triggers the analysis operation. For example, the rule based hardware error analysis engine 120 compares the decoded error structure type value with the retrieved rules. The rule based hardware error analysis engine 120 supports thresholding, suppression and pattern matching using historical error stored in an internal error database. This platform-independent, light weight and portable rule based hardware error analysis engine 120 allows reuse of solution components, thereby enabling a standardized fault management solution across multiple enterprise devices. Also, the robust hardware fault management module 112 generates an error event and/or alert and initiates one or more actions defined in the rules upon finding a match or based on the outcome of the comparison. Particularly, the event generation module 116 generates the error event and/or alert and initiates the one or more actions defined in the rules upon finding the match or based on the outcome of the comparison.

Figure 2:
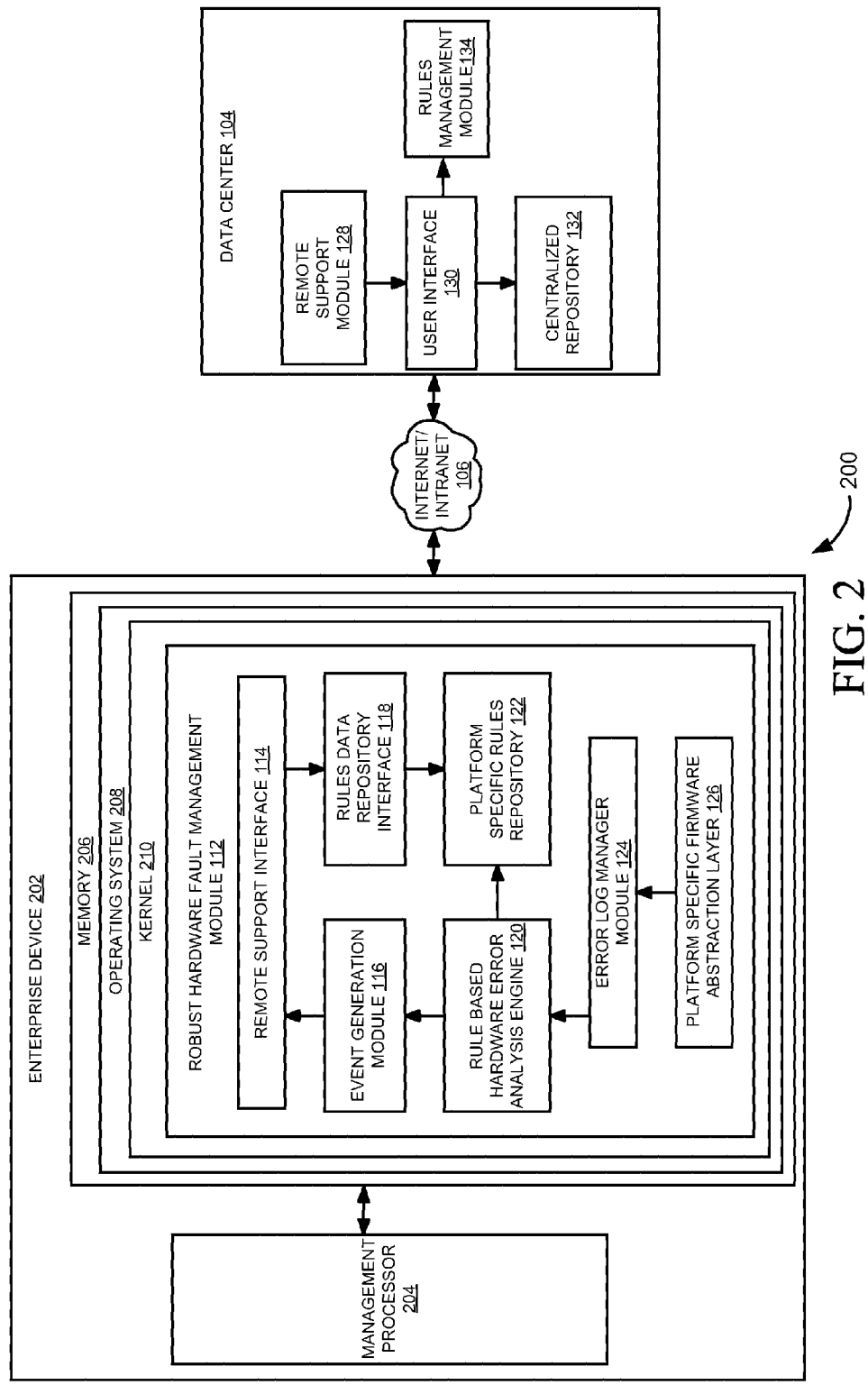
FIG. 2 illustrates another exemplary block diagram of the robust hardware fault management system for the enterprise device.

Referring now to FIG. 2, which is another exemplary block diagram 200 of the robust hardware fault management system for an enterprise device 202. As shown in FIG. 2, the robust hardware fault management system includes the enterprise device 202, data center 104 and Internet/Intranet 106. Further, the enterprise device 202 includes a management processor 204 and memory 206. Furthermore, the memory 206 includes an operating system (OS) 208. In addition, the OS 208 includes a kernel 210. Moreover, the kernel 210 includes the robust hardware fault management module 112. Also, the robust hardware fault management module 112 includes the remote support interface 114, the event generation module 116, the rules data repository interface 118, the rule based hardware error analysis engine 120, the platform specific rules repository 122, the error log manager module 124, and the platform specific firmware abstraction layer 126. Further, the data center 104 includes the remote support module 128, the user interface 130, the centralized repository 132 and the rules management module 134.

Also, the enterprise device 202 is connected to the data center 104 via the Internet/Intranet 106. Further, the management processor 204 is coupled to the memory 206. Furthermore, the platform specific firmware abstraction layer 126 is coupled to the error log manager module 124. In addition, the error log manager module 124 is coupled to the rule based hardware error analysis engine 120. Moreover, the rule based hardware error analysis engine 120 is coupled to the platform specific rules repository 122 and the event generation module 116. Also, the event generation module 116 is coupled to the remote support interface 114. Further, the remote support interface 114 is coupled to the rules data repository interface 118. Furthermore, the rules data repository interface 118 is coupled to the platform specific rules repository 122. In addition, the remote support module 128 is coupled to the user interface 130. Moreover, the user interface 130 is coupled to the rules management module 134 and the centralized repository 132. Also, the rules management module 134 is coupled to the centralized repository 132.

In operation, the rules management module 134 identifies hardware devices and associated hardware modules in the enterprise device 202 requiring the robust hardware fault management. Further, the rules management module 134 determines error structures, with unique type values, containing hardware control and status registers and other related information, associated with each hardware module and assigns unique identifiers to the determined error structures. Furthermore, the rules management module 134 models the error structures in the centralized repository 132. In addition, the rules management module 134 associates rules with each modeled error structure for detecting hardware failures. Moreover, the rules management module 134 stores the rules of each modeled error structure in the centralized repository 132 using associated rule identifiers.

Further, the robust hardware fault management module 112 dynamically updates/stores the rules of each modeled error structure in the platform specific rules repository 122 by obtaining the rules of the modeled error structures from the centralized repository 132 upon connecting to the centralized repository 132. In one example, the rules applicable for the enterprise device 202 are downloaded using the remote support interface 114. Alternatively, a customer or support engineer can run a command on the OS 208 to download the hardware analysis rules with the new CSR/MSR settings from a designated storage area. Further, the rules data repository interface 118 supports authenticated applications and users to dynamically update rules and events in the platform specific rules repository 122 without the need for a firmware update.

Furthermore, the robust hardware fault management module 112 receives an error structure associated with a hardware module in a binary or platform specific format upon an occurrence of a hardware error associated with the hardware module. In addition, the robust hardware fault management module 112 decodes the error structure from the binary or platform specific format to a standard format and assigns a unique type value to the decoded error structure. Moreover, the robust hardware fault management module 112 compares the decoded error structure type value with the rules of the modeled error structures stored in the platform specific rules repository 122. Also, the robust hardware fault management module 112 generates the error event and/or alert and initiates one or more actions defined in the rules upon finding the match or based on the outcome of the comparison. This is explained in more detailed with reference to FIG. 1.

Figure 3:
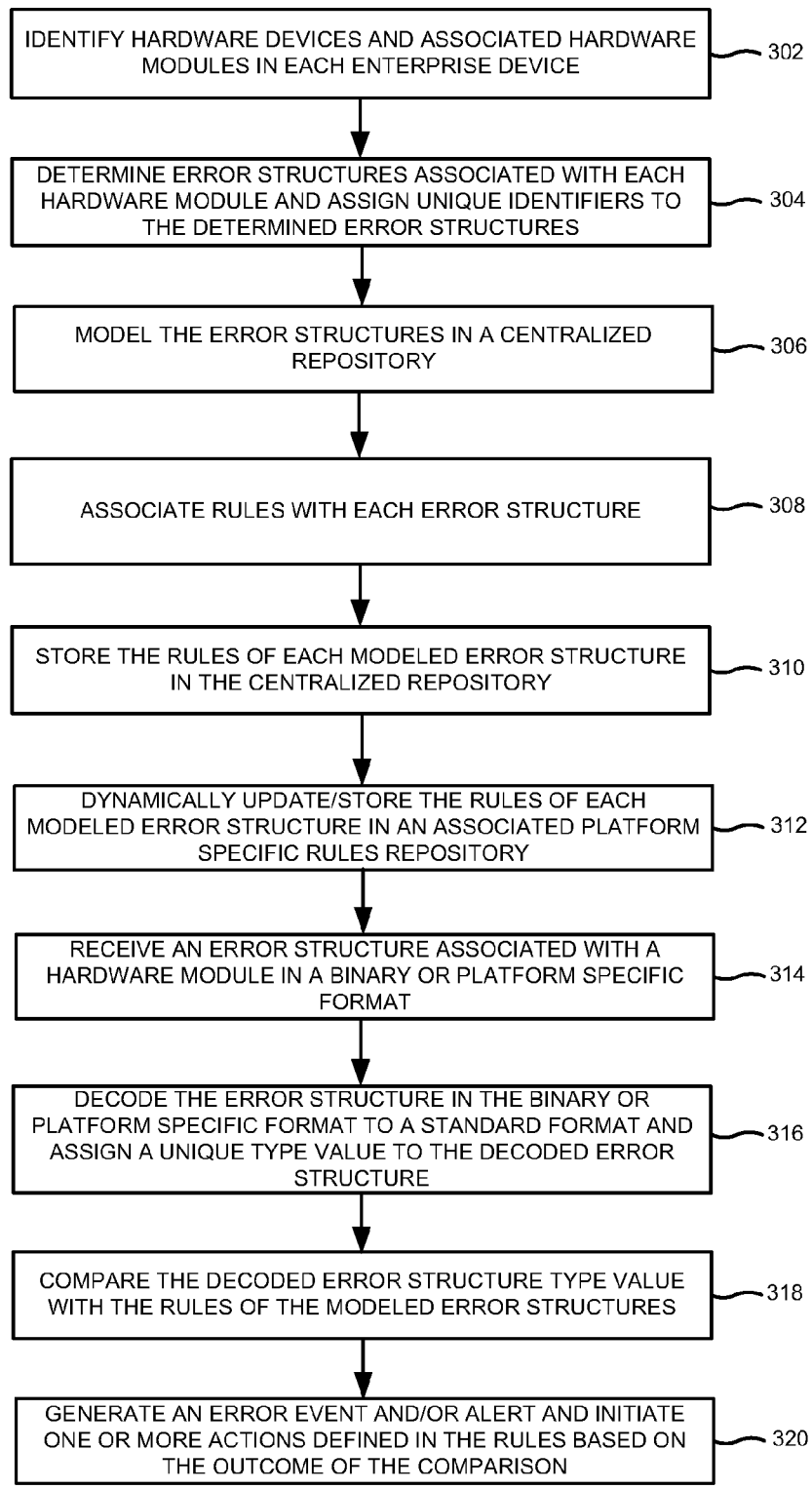
FIG. 3 illustrates an example flow diagram of a method for providing robust hardware fault management for the enterprise devices, such as those shown in FIGS. 1 and 2.

Referring now to FIG. 3, which is an example flow diagram 300 that illustrates a method for providing robust hardware fault management for enterprise devices, such as those shown in FIGS. 1 and 2. At block 302, hardware devices and associated hardware modules in each of the enterprise devices requiring the robust hardware fault management are identified. Exemplary enterprise devices include a server, a storage device, a networking device and the like. For example, the hardware device includes a processor, memory, a chipset, a host bus adapter (HBA) and the like. Exemplary hardware module includes a cache, a memory controller, a dynamic random-access memory (DRAM), a static random-access memory (SRAM) and the like. At block 304, error structures, with unique type values, associated with each hardware module are determined and unique identifiers are assigned to the determined error structures. At block 306, the error structures are modeled in a centralized repository. At block 308, rules are associated with each modeled error structure for detecting hardware failures. For example, a rule is shown below:
<Error Structure TypeMEMORY_ERROR, Platform ID=ABCD"> Rule ID=1, RULE CONDITION {MEMORY_ERROR.errstatus<OPERATOR> 'VALUE' WITH THRESHOLD=10, THRESHOLD_WINDOW=1440 (in minutes), SUPRESSION_WINDOW=1440 (in minutes) ON DEVICE_ID=MEMORY_ERROR.PhysicalLocation}
ACTION {generate_event(1440); platform_specific_action (Action UUID)}

In this example, the rule is defined for an error structure of type MEMORY_ERROR (dual in-line memory module (DIMM) errors) and is defined for a platform type identified by the string "ABCD". The <OPERATOR> takes the values, such as EQUAL, BITAND, BITOR etc., and the condition part of the rule includes multiple field: <OPERATOR>: VALUE constructs. The THRESHOLD_WINDOW and SUPRESSION_WINDOW values are applied to the enterprise device identified by DEVICE_ID. The DEVICE_ID identifies the enterprise device instance on which the analysis rules are applied at run time (e.g., physical location of the enterprise device). The action is to generate a support event and taking platform specific self-healing actions (e.g., deactivation of failed component) using a unique action UUID.

For example, the analysis of the hardware failures is based on a rule language that supports use of sub-rules and allows combination of sub-rules into a single rule and further allows analysis of aggregated error structures. Further, the rule language captures CSR/MSR fields, along with applicable operators (AND, OR etc.,), platform specific identifiers, threshold values and platform specific self-healing actions that are required for analysis, self-healing of a hardware error and the like. The rule language can be easily extended by adding new keywords that act as function identifiers. A rule based hardware error analysis engine (e.g., the rule based hardware error analysis engine 120 of FIGS. 1 and 2) that parses the rules looks for plug-in modules registered using the function identifiers and invokes the appropriate handler. This makes the hardware analysis rules language extensible and can be customized based on platform requirements. At block 310, the rules of each modeled error structure are stored in the centralized repository using associated rule identifiers. For example, each rule is identified using a unique identifier and each error structure stored in the centralized repository is identified using a unique identifier.

At block 312, the rules of each modeled error structure are dynamically updated/stored in an associated platform specific rules repository residing in each of the enterprise devices by obtaining the rules of the modeled error structures from the centralized repository upon connecting to the centralized repository. At block 314, an error structure associated with a hardware module is received in a binary or platform specific format upon an occurrence of a hardware error associated with the hardware module. At block 316, the error structure in the binary or platform specific format is decoded to a standard format and a unique type value is assigned to the decoded error structure. This is explained in more detailed with reference to FIG. 1. At block 318, the decoded error structure type value is compared with the rules of the modeled error structures stored in the platform specific rules repository. At block 320, an error event and/or alert are generated and one or more actions defined in the rules are initiated upon finding a match or based on the outcome of the comparison.

In one example, an article comprising a non-transitory computer readable storage medium having instructions thereon which when executed by a computing platform result in execution of the above mentioned methods. The methods described in the foregoing may be in a form of a machine-readable medium embodying a set of instructions that, when executed by a machine, causes the machine to perform any method disclosed herein. It will be appreciated that the various examples discussed herein may not be the same example, and may be grouped into various other examples not explicitly disclosed herein.

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

In various examples, systems and methods described in FIGS. 1-3 propose a technique for providing robust hardware fault management using rules for enterprise devices. The technique helps in managing and leveraging rules across different enterprise devices. The technique also helps to standardize on error analysis algorithms for shared hardware components. Further, the rule language helps in simplifying the current fault management solution and the portable and levergable generic analysis engine helps in reuse of solution components across multiple enterprise devices. Furthermore, the dynamic update of the rules helps in adding/modifying fault management capabilities without any firmware upgrade.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for providing robust hardware fault management for enterprise devices, comprising:
    identifying hardware devices and associated hardware modules in each of the enterprise devices;
    modeling error structures associated with each hardware module in a centralized repository;
    associating rules with each modeled error structure for detecting hardware failures, wherein the associated rules are based on a rule language that supports use of sub-rules and allows combination of sub-rules into a single rule; and
    storing the rules of each modeled error structure in the centralized repository.

2. The method of claim 1, further comprising;
    dynamically updating/storing the rules of each modeled error structure in an associated platform specific rules repository residing in each of the enterprise devices by obtaining the rules of the modeled error structures from the centralized repository upon connecting to the centralized repository.

3. The method of claim 2, further comprising:
    receiving an error structure associated with a hardware module in a binary or platform specific format upon an occurrence of a hardware error associated with the hardware module;
    decoding the error structure in the binary or platform specific format to a standard format and assigning a unique type value to the decoded error structure;
    comparing the decoded error structure type value with the rules of the modeled error structures stored in the platform specific rules repository; and
    generating an error event and/or alert and initiating one or more actions defined in the rules based on the outcome of the comparison.

4. The method of claim 1, wherein the enterprise devices are selected from the group consisting of a server, a storage device and a networking device.

5. The method of claim 1, wherein the hardware device is selected from the group consisting of a processor, memory, a chipset, and a host bus adapter (HBA).

6. The method of claim 1, wherein the hardware module is selected from the group consisting of a cache, a memory controller, a dynamic random-access memory (DRAM), and a static random-access memory (SRAM).

7. The method of claim 1, wherein analysis of the hardware failures further allows analysis of aggregated error structures.

8. The method of claim 1, wherein the rule language allows to capture control status register (CSR)/model specific register (MSR) fields along with applicable operators, platform specific identifiers, threshold values and platform specific self-healing actions that are required for analysis and self-healing of a hardware error.

9. A robust hardware fault management system, comprising:
    a data center comprising a centralized repository and a rules management module;
    an Internet/Intranet; and
    an enterprise device coupled to the data center via the Internet/Intranet, wherein the enterprise device comprises:
    a management processor; and
    memory coupled to the management processor, wherein the memory comprises an operating system (OS) including a kernel, wherein one of the kernel and management processor includes a robust hardware fault management module, wherein the rules management module identifies hardware devices and associated hardware modules in the enterprise device, wherein the rules management module determines error structures associated with each hardware module and assigns unique identifiers to the determined error structures, wherein the rules management module models the error structures in the centralized repository, wherein the rules management module associates rules with each modeled error structure for detecting hardware failures, the associated rules based on a rule language that supports use of sub-rules and allows combination of sub-rules into a single rule and wherein the rules management module stores the rules of each modeled error structure in the centralized repository using associated rule identifiers.

10. The system of claim 9, wherein the robust hardware fault management module dynamically updates/stores the rules of each modeled error structure in an associated platform specific rules repository residing in the enterprise device by obtaining the rules of the modeled error structures from the centralized repository upon connecting to the centralized repository.

11. The system of claim 10, wherein the robust hardware fault management module is further configured to:
    receive an error structure associated with a hardware module in a binary or platform specific format upon an occurrence of a hardware error associated with the hardware module;
    decode the error structure in the binary or platform specific format to a standard format and assign a unique type value to the decoded error structure;
    compare the decoded error structure type value with rules of the modeled error structures stored in a platform specific rules repository, the rules based on a rule language that supports use of sub-rules and allows combination of sub-rules into a single rule; and
    generate an error event and/or alert and initiate one or more actions defined in the rules based on the outcome of the comparison.

12. The system of claim 9, wherein the enterprise device is selected from the group consisting of a server, a storage device and a networking device.

13. A non-transitory computer-readable storage medium for robust hardware fault management for enterprise devices having instructions that when executed by a computing device, cause the computing device to:
    identify hardware devices and associated hardware modules in each of the enterprise devices;
    model error structures associated with each hardware module in a centralized repository;
    associate rules with each modeled error structure for detecting hardware failures, the associated rules based on a rule language that supports use of sub-rules and allows combination of sub-rules into a single rule; and store the rules of each modeled error structure in the centralized repository.

14. The non-transitory computer-readable storage medium of claim 13, further comprising:

dynamically updating/storing the rules of each modeled error structure in an associated platform specific rules repository residing in each of the enterprise devices by obtaining the rules of the modeled error structures from the centralized repository upon connecting to the centralized repository.

15. The non-transitory computer-readable storage medium of claim 4, further comprising:

receiving an error structure associated with a hardware module in a binary or platform specific format upon an occurrence of a hardware error associated with the hardware module;

decoding the error structure in the binary or platform specific format To a standard format and assigning a unique type value to the decoded error structure;

comparing the decoded error structure type value with the rules of the modeled error structures stored in the platform specific rules repository; and generating an error event and/or alert and initiating one or more actions defined in the rules based on the outcome of the comparison.

16. The method of claim 1, further comprising assigning unique identifiers to the modeled error structures.

17. The method of claim 9, wherein the rules of each modeled error structure are stored in the centralized repository using the associated rule identifiers.

18. The method of claim 13, further comprising the executable instructions to cause the computing device to assign unique identifiers to the modeled error structures.

19. The method of claim 18, wherein the rules of each modeled error structure are stored in the centralized repository using the associated rule identifiers.

* * * * *